United States Patent [19]

Neubeck

[11] Patent Number: 5,584,414
[45] Date of Patent: Dec. 17, 1996

[54] THERMALLY-INSULATING COOKWARE ARTICLES

[75] Inventor: James W. Neubeck, New Berlin, Wis.

[73] Assignee: RES Manufacturing Co., Milwaukee, Wis.

[21] Appl. No.: 320,730

[22] Filed: Oct. 11, 1994

[51] Int. Cl.[6] ...................................................... B65D 25/10
[52] U.S. Cl. ........................... 220/753; 7/151; 16/110.5; 16/114 A; 16/118; 16/121; 220/912; 220/DIG. 21
[58] Field of Search ................................ 220/212.5, 912, 220/256, DIG. 21, 753; 16/110 A, 110.5, 118, 121, 114 R, 114 A; 99/645, 645 R; 150/155, 154; 7/151

[56] References Cited

U.S. PATENT DOCUMENTS

| D. 185,912 | 8/1959 | Rvale . |
| D. 211,298 | 6/1968 | Hall . |
| D. 212,379 | 10/1968 | Dudas et al. . |
| D. 261,349 | 10/1981 | Ryser . |
| D. 284,444 | 7/1986 | Baumgarten . |
| 2,235,313 | 3/1941 | Cleveland ............................ 7/151 X |
| 2,590,395 | 3/1952 | Fry ....................................... 16/118 |
| 2,731,663 | 1/1956 | Thompson ...................... 220/212.5 X |
| 2,908,417 | 10/1959 | Conner et al. ........................ 220/256 |
| 4,001,904 | 1/1977 | Gill ......................................... 7/151 |
| 4,571,111 | 2/1986 | Keogh ................................. 16/118 X |
| 4,844,252 | 7/1989 | Barron et al. ........................ 206/223 |
| 4,856,140 | 8/1989 | Visco et al. ........................ 16/118 X |
| 4,976,299 | 12/1990 | Bickelman .......................... 150/155 |
| 5,156,456 | 10/1992 | Hoftman et al. ................... 16/114 R |

Primary Examiner—Allan N. Shoap
Assistant Examiner—Robin A. Hylton
Attorney, Agent, or Firm—Reinhart, Boerner, Van Deuren, Norris & Rieselbach, s.c.

[57] ABSTRACT

An article and resin composition for relocating heated cookware accessories and utensils, for the prevention of burns and related injuries. The polymeric resin compositions provide the articles the desired material specifications, functional characteristics and performance properties required to enhance utility and ease of manufacture.

14 Claims, 1 Drawing Sheet

THERMALLY-INSULATING COOKWARE ARTICLES

BACKGROUND OF THE INVENTION

This invention is related, generally, to articles providing thermal insulation and protection from heated cookware covers and, more particularly, lid covers through use of a thermally-stable silicone resin composition.

Traditionally, either in the home or a commercial setting, hot kettles, pots, pans and the like have been moved gingerly with the aid of a pliable piece of cloth. The most prevalent variation of this domestic staple is the common pot holder, which works well enough for engaging heated, balanced cookware over large surface areas, i.e., grasping the bottom of a kettle or evenly spaced handles with both hands protected by pot holders. However, for more intricate maneuvers, pot holders lack optimal functionality. Usually, the holders do not conform adequately to the shape of a heated surface. When they do conform, the shape is not retained. In either instance, a serious accident or badly burned hands and fingers can result.

Early concern over these and other problems fostered the use of oven mitts and similar such variations. However, the improvements realized are somewhat limited. Flexibility and shape retention are enhanced as compared to pot holders, but the mitts are subject to wear over time. The insulation can separate leaving hands and fingers largely unprotected. Unsightly burn marks are aesthetically unpleasing. Moreover, mitts and similar such articles do not permit the degree of dexterity often required.

The search for an efficient, effective cookware handling device, meeting the requirements outlined above, has been an ongoing concern in the art. One approach which has been used with certain success, involves use of a molded cover article fittable over the knob or handle of a lid. Such covers provide some heat protection and permit manual dexterity by alleviating the need for unwieldy holders or mitts. However, the prior art has associated with it a number of significant problems and deficiencies. Most are related to the cover configuration and result, in part, from the materials from which they are made.

A major problem of the prior art is that the materials used to devise such covers are often unacceptably hard and entirely too rigid. As a result, the covers lack the flexibility required to slide over and conform to the shape of a lid knob or a similar such utensil. Alternatively, if the covers are made from materials flexible enough for easy attachment, the problem becomes one of slippage during use, with the risk of a dropped lid, burns or both.

Another related problem is poor insulation. Most knob covers of the prior art seem to provide little resistance to thermal conductivity and, with respect to surfaces not directly contacted, little protection from thermal radiation. Moreover, the materials used are subject to thermal or oxidative degradation, such that performance, if initially acceptable, declines over time.

A related concern is that knob covers of the prior art are aesthetically unsatisfactory and incompatible with contemporary cookware design. Limitations in material composition, as well as the effects of wear and time, leave such articles unsuitable for use with most high-end cookware and utensils.

In summary, there are a considerable number of drawbacks and problems relating to knob covers and the materials from which they have been made. There is a need for an improved cover and resin composition useful therewith to fully realize the benefits provided by such an article.

OBJECTS OF THE INVENTION

It is an object of this invention to overcome the problems and shortcomings of the prior art, including those outlined above.

It is an object of this invention to provide articles used in conjunction with cookware, cookware accessories, and related utensils.

It is another object of this invention to provide cover articles and materials used therewith which are flexible enough to conform to and engage a piece of cookware or a related utensil, yet rigid enough to maintain its shape and frictional contact with the cookware after extended heating periods.

It is yet another object of this invention to provide a cover article and/or resin composition capable of incorporating a variety of colorants and/or pigments, while useful over an extended temperature range.

Another object of this invention is to provide a thermally-stable polymeric resin composition easily modified with a variety of pigment materials and used in product manufacture.

Another object of this invention is to provide an apparatus for relocating and/or transferring a heated cookware article, accessory or utensil, utilizing a temperature-stable resin substantially unchangeable over extended heating periods.

It is an object of this invention to provide a cover article and related devices utilizing air volumes between the article and a heated surface to provide thermal insulation.

These and other important articles will be apparent from the following descriptions and examples of the present invention.

SUMMARY OF THE INVENTION

This invention is a cover article for use with a lid or similar such cookware utensils, and a resin composition which imparts to the article certain predetermined needed performance qualities and characteristics required for optimal utilization. The invention overcomes certain well-known problems and deficiencies, including those outlined above.

In part, this invention can be used in combination with a thermally-conductive lid of the type employed with cookware, the lid having an upward surface and a grasping projection connected thereto. The invention includes means removably engaging the grasping projection to relocate the lid from the cookware. Continuous cap and neck portions of the relocating means have a mating relationship with the grasping projection. The portions also have inner and outer surfaces and means on at least one of the surfaces forming a plurality of chambers and/or interstices between that portion and the grasping projection. The relocating means also includes a flexible flange section on the neck portion contacting the lid surface. In preferred embodiments, the chamber and/or interstitial forming means includes at least two rib members. The rib members can be annular. In highly preferred embodiments, the annular rib members are substantially concentric and frictionally contact the grasping projection.

Likewise, in highly preferred embodiments, the flange section conforms to the lid surface, particularly where the lid surface is convex. The conforming flange section sealingly engages the lid surface and has a diametral dimension greater than the width dimension of the cap portion. In preferred embodiments, the neck, cap and flange are constructed of a thermally-stable material. In highly preferred embodiments, the material is a polymeric silicone/siloxane composition, stable at temperatures up to about 400° F., such that the mating relationship of the neck and cap portions with the grasping protection, as well as the sealing engagement of the flange section, are maintained.

In part, this invention is a knob cover article for a cooking utensil of the type having a surface and handle extending therefrom. The cover includes continuous cap and neck portions, each of which contact the handle surface. Protrusion members from either the cap or neck, or both, contact the handle and form at least one channel or interstice therealong. The neck portion concludes with a flange distal to the cap portion.

In preferred embodiments, the protrusions are rib members on the surface of the cap which contacts the handle. In highly preferred embodiments, the rib members are annular and frictionally contact the handle. Likewise, in highly preferred embodiments, the flange flexibly conforms to the utensil surface, sealingly engages that surface, and has a diametral dimension greater than the width dimension of the cap portion.

In part, this invention is a polymeric resin composition, which can be used to construct the relocating means and/or knob cover articles described herein. The inventive resin includes: (1) about 30–70 parts by weight vinylterminated polydimethylsiloxane; (2) about 40–70 parts by weight dimethylvinylsiloxane; (3) about 3–10 parts by weight hydroxyterminated polydimethylsiloxane; (4) about 1–5 parts by weight hydroxyterminated(methoxylated vinyl)siloxane; and (5) about 30–70 parts by weight silica filler material. In preferred embodiments, the resin composition includes a pigment material dispersed within a polydimethylsiloxane fluid, gum or paste. In highly preferred embodiments, the ratio of dispersed pigment material to siloxane material is about 3:1, and the fluid dispersion is about 1–3 parts by weight.

In preferred embodiments, the resin includes 1–3 parts by weight lubricant and is cured by reaction with a peroxide free radical initiator. In highly preferred embodiments, the lubricant is selected from the group consisting of fluoroaliphatic alcohols, metal stearates, and the mixtures thereof. Likewise, in highly preferred embodiments, the initiator is selected from the group consisting of α,α-bis(t-butylperoxy)diisopropylbenzene, dicumyl peroxide, 2,5-dimethyl-2,5-di(t-butylperoxy)hexane, and N-butyl-4,4-bis(t-butylperoxy)valerate, or mixtures thereof.

In highly preferred embodiments, as used in the construction of the relocating means and/or knob cover articles described herein, the resin composition includes: (1) about 30–45 parts by weight vinylterminated polydimethylsiloxane; (2) about 50–60 parts by weight dimethylvinylsiloxane; (3) about 8–10 parts by weight hydroxyterminated polydimethylsiloxane; and (4) about 3–5 parts by weight hydroxyterminated polydimethyl(methoxylated-vinyl)siloxane; and (5) about 40–50 parts by weight silica filler, with the filler including about 20–40 parts by weight precipitated silicon dioxide and about 10–30 parts by weight fumed silica. By way of further describing a highly preferred embodiment, the resin composition of the present invention can include about 1–3 parts by weight pigment material dispersed in polydimethylsiloxane fluid, and about 2 parts by weight of a fluoroaliphatic alcohol/zinc stearate mixture as a lubricant.

As already noted, a cover article, as described herein, offers certain advantages. The knob cover of this invention allows those advantages to be more fully realized. A preferred cover is flexible enough to be slipped over the knob of a glass, ceramic, phenolic, or similar such lid without undue manipulation. In particular, the flexibility of the flange section permits the cover to adapt to and engage, by way of a pressure differential, the surface of a lid. While flexibility is important, a certain degree of rigidity is also necessary for optimal performance. Chamber forming means or, alternatively, protrusion members, on the surface of the cap and/or neck portions contacting the lid or utensil, provide the article the rigidity necessary to prevent disengagement during use. Moreover, these and related structural features operate to provide insulating air volumes and contact the lid knob/handle to prevent slippage during use.

The relocating means and cover articles of the present invention can be used with cookware and the like either in the oven or on the stove top. The preferred resin materials, used in their construction, do not burn under an open flame, and are able to withstand temperatures up to 400° F. for sustained periods of time, without change in appearance, shape, or performance properties.

The performance and manufacture of the present articles are directly related and attributable to the inventive resin compositions. The various desired material properties, functional characteristics, and performance properties are met through a unique formulation, which also provides for efficient, cost-effective manufacture. Each resin component and its relative concentration, reflects an optimal balance between flexibility and rigidity. Use of any one component outside the indicated concentration range adversely affect the compositional flexibility and/or hardness and interrupts the characteristics and performance properties observed.

This invention also allows for introduction of various pigments and/or colorants into the resin composition. As a result, the relocating means and cover articles described herein can be color coordinated with the design and appearance of companion cookware and related utensils. While a non-pigmented embodiment performs satisfactorily within the parameters described herein, the appropriate coloration enhances the utility of any such article, in that it is more likely to be used during cooking and related food preparation.

DETAILED DESCRIPTION OF THE PREFERRED EMBODIMENT

Figure 1:
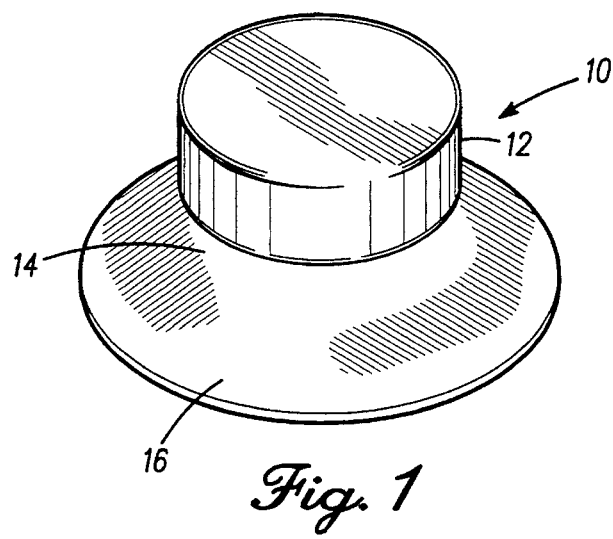
FIG. 1 is a full perspective view of an improved knob cover article, in accordance with this invention.
Figure 2:
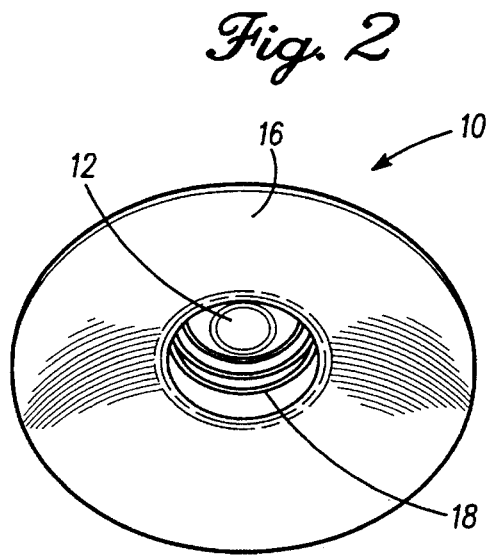
FIG. 2 is a bottom view of a preferred knob cover article, in accordance with this invention and corresponding to the article illustrated in FIG. 1.

The drawings illustrate a knob cover article 10 which is a preferred embodiment of this invention. As shown in FIGS. 1–2, the article includes cap portion 12 continuous with neck portion 14, which terminates in flange section 16. As best shown in FIG. 2, the contact surface of cap portion 12 provides annular, concentric rib members 18 which impart a desired rigidity to cap portion 12, contact the lid knob surface, and prevent slippage during use.

Figure 3:
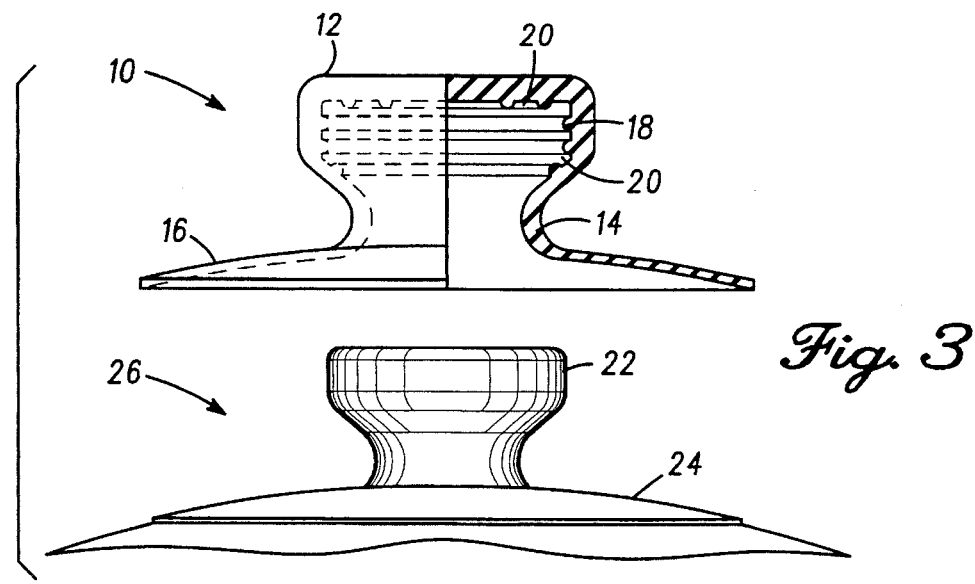
FIG. 3 is a fragmentary sectional view of a preferred knob cover article, showing its usefulness in conjunction with a cookware lid.
Figure 4:
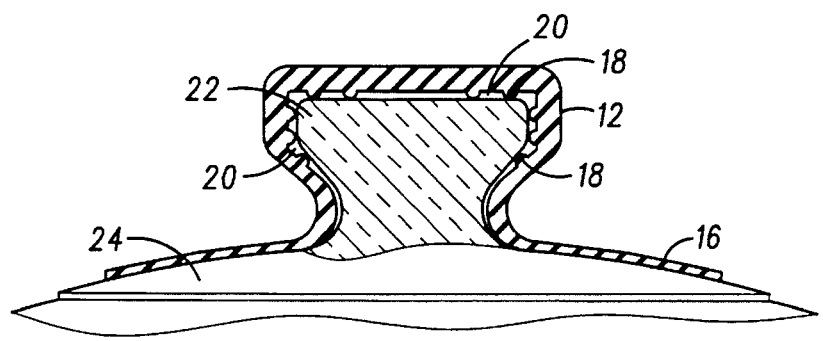
FIG. 4 is an enlarged cross-sectional view of a knob cover of the present invention in combination with a cookware lid.

As best shown in FIGS. 3–4, rib members 18 in contact with the surface of lid knob 22 form a plurality of chambers 20 which provide the advantages inherent from such a structure, including those described above. Flange section 16 flexibly conforms to and sealingly engages surface 24 of lid 26, further enhancing the desired gripping action and providing a barrier between the user and surface 24, thereby interrupting the radiation of heat.

As described above, the physical characteristics and performance properties of the present invention are due, in part, to utilization of the polymeric resins described herein. While the articles can be manufactured from other materials meeting the desired requirements, excellent results are realized through use of the present materials. The inventive compositions can be obtained through Rubber Industries, Inc. of Shakopee, Minn. or can be prepared according to procedures well-known to those skilled in the art from four separate silicone resins, available under the 401-80, 200-40, 1482, and 401-70 composite designations, from Walker Silicone Corporation of Adrian, Mich. Each such composite includes vinylterminated polydimethylsiloxane, dimethylvinylsiloxane, hydroxyterminated polydimethylsiloxane, and hydroxyterminated(methoxylated vinyl)siloxane. Ranges of these components useful with the present invention were determined based on the results obtained from standard American Society for Testing and Materials (ASTM) test procedures, as described below. The weight ranges provided herein were calculated on the basis of component concentration for each individual resin composite. Deviation of any one concentration above or below the range indicated, whether alone or in combination with deviation of another component, adversely affects the required balance of flexibility with rigidity.

Other components important to overall composition and the performance of the relocating means and/or cover articles of the present invention are also readily available from commercial sources: precipitated silicon dioxide and synthetic fumed silica (Walker Silicone Corporation or Pittsburgh Paint & Glass, Pittsburgh, Pa.); internal lubricant additives such as fluoroaliphatic alcohols and metal stearates (Walkers Silicone Corporation) peroxide curing agents (R. T. Vanderbilt or Arko Chemical Corporation); and various pigments STAN-TONE HCC-11692 red and 90SPO7 black, Harwick Chemical Corporation of Akron, Ohio, Gayson Pigments of Akron, Ohio, Walker Silicon Corporation or Arko Chemical Corporation.

With respect to coloration of the inventive compositions, the pigments are mechanically dispersed in dimethylpolysiloxane, then added to the resin component. The relative pigment concentration is dependent upon the degree and shade of coloration desired. The dispersion is, generally, approximately 75% pigment and 25% siloxane, adjustable to suit various coloration and/or shade requirements. The preferred ratio of dispersed pigment material to siloxane fluid is about 3:1 and the fluid dispersion totals about 1–3 parts by weight.

In each of the examples that follow a polymeric resin, in accordance with the present invention, was prepared using a 6" by 13" two roll laboratory mill. The silicone resins were banded on the mill rolls, such that the polymers were blended for 5–8 minutes, afterwhich the pigments, additives, and fillers were incorporated therein. The well-blended composition was cut down from the mill rolls and cooled for five minutes, and replaced on the mill rolls for banding. Curing was accomplished by adding 0.5–1.25 parts by weight of one or more peroxide initiators. After thorough blending, the compound was cut and removed from the mill. Rubber injection presses and molds can be used, subject to appropriate modifications known to those skilled in the art and made aware of this invention, to prepare the relocating means and cover articles described herein. A preferred embodiment of the inventive polymer resin, having 30 parts by weight vinylterminated polydimethylsiloxane, 55 parts by weight dimethylvinylsiloxane, 10 parts by weight hydroxyterminated polydimethylsiloxane, 5 parts by weight polydimethyl(methoxylated vinyl)siloxane, 30 parts by weight precipitated silicon dioxide, 15 parts by weight synthetic fumed silica, 2 parts by weight lubricant, and 1 part by weight curing agent, was subjected to various ASTM standard test procedures for the purpose of illustrating the improved performance properties imparted to the articles of this invention.

EXAMPLE 1

Following the method described in ASTM D 2240-91, the above-formulated resin was evaluated for hardness (A scale), giving a hardness value range of 62–75.

EXAMPLE 2

Following the method described in ASTM D 412-92. the above-formulated resin was evaluated on the basis of its (a) tensile strength (550–900 psi); (b) percent elongation (240–400 percent); and (c) stress at 100% elongation (400–650 psi).

EXAMPLE 3

Following the method described in ASTM D 792-91, the specific gravity of the above-formulated resin was determined as having a range of 1.179–1.493 kg/m$^3$.

EXAMPLE 4

Following the method described in ASTM D 395-89, (method B at 375° F. for 22 hours), the above-formulated resin was evaluated on its ability to retain its elastic properties after the prolonged action of compressive stresses, leaving 15–25% of its original thickness.

EXAMPLE 5

Following the method described in ASTM D 624-91, (Die B), the above-formulated resin was evaluated on the basis of its resistance to tearing action, giving a tear-strength of 75–115 lb./in.

EXAMPLE 6

The above-formulated resin was subjected to an open gas flame for a 2–3 minute period, with no melting. Slight charring was observed, but easily dusted off upon cooling to reveal a resin substantially unchanged with respect to appearance or hardness.

EXAMPLE 7

The above-formulated resin was heated at oven temperatures of about 400° F. for periods of 1–2 hours, without melting or related material failure. As provided in Example 6, slight charring was readily removed.

While principles of this invention have been described in connection with specific embodiments, it should be understood clearly that these descriptions are added only by way of example and are not intended to limit, in any way, the scope of the invention. For example, the properties of the resins subjected to the procedures outlined in the preceding examples are largely unaffected by the inclusion of any one of several available pigment or colorant dispersions. Likewise, articles prepared from the inventive resins can vary in shape, configuration, or design, subject only to the rubber injection presses and molding equipment used therewith. The insulation provided through use of such resins and/or articles can be achieved with a variety of projection, protrusion, rib, nub, or ridge members and the like, subject only to their ability to provide a volume of air between the article and the utensil engaged therewith. Other advantages and features will become apparent from the claims hereinafter, with scope of the claims determined by the reasonable equivalents as understood by those skilled in the art.

I claim:

1. A knob cover article for a cooking utensil of the type having a surface and a knob extending therefrom, said article comprising:

continuous cap and neck portions, each of said portions having a non-threaded knob contact surface and said neck portion having a cross-dimension less than the cross-dimension of said cap portion;

protrusion members from at least one of said contact surfaces forming at least one channel therealong; and a flange on said neck portion distal to said cap portion.

2. The article as defined in claim 1 wherein said protrusions are rib members on said cap contact surface.

3. The article as defined in claim 2 wherein said rib members are annular.

4. The article as defined in claim 1 wherein said flange flexibly conforms to the utensil.

5. The article as defined in claim 2 wherein said flange sealingly engages the utensil.

6. The article as defined in claim 5 wherein said flange has a diametral dimension greater than the cross-dimension of said cap.

7. In combination with a thermally-conductive lid of the type usable with cookware, the lid having an upward surface and a grasping projection connected thereto, means removably engaging the grasping projection to relocate the lid from the cookware wherein said relocating means comprises continuous cap and neck portions having a non-threaded frictional mating relationship with the grasping projection, said portions further having inner and outer surfaces and means on said cap portion surface forming a plurality of chambers between said portion and the projection, said neck portion having a cross-dimension less than the cross-dimension of said cap portion, and a flexible flange section on said neck portion contacting the lid surface.

8. The combination as defined in claim 7 wherein said chamber forming means comprises at least two rib members.

9. The combination as defined in claim 8 wherein said rib members are annular.

10. The combination as defined in claim 9 wherein said annular rib members are substantially concentric.

11. The combination as defined in claim 7 wherein the lid surface is convex and said flange section conforms thereto.

12. The combination as defined in claim 11 wherein said flange section sealingly engages the lid surface.

13. The combination as defined in claim 11 wherein said flange section has a diametral dimension greater than the cross-dimension of said cap portion.

14. The combination as defined in claim 7 wherein said relocating means comprises a material thermally stable at temperatures up to about 400° F., such that said relocating means maintains said mating relationship.

* * * * *